Nov. 21, 1961   P. FESSEL   3,009,456
ABRADING CUTTERS AND METHODS FOR THEIR FABRICATION
Filed Jan. 21, 1959   6 Sheets-Sheet 1
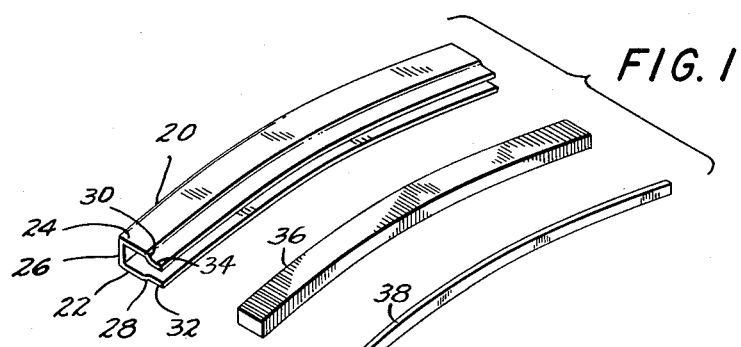
FIG. 1
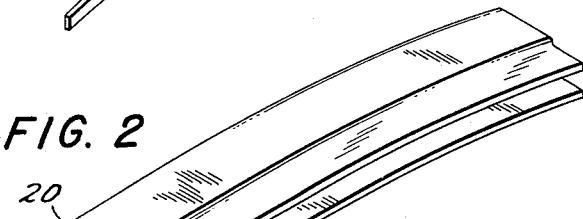
FIG. 2
FIG. 3
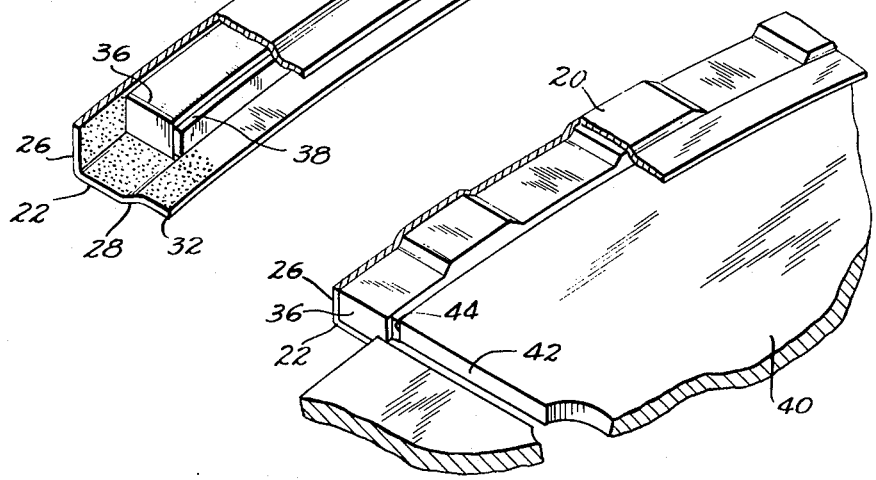
FIG. 4
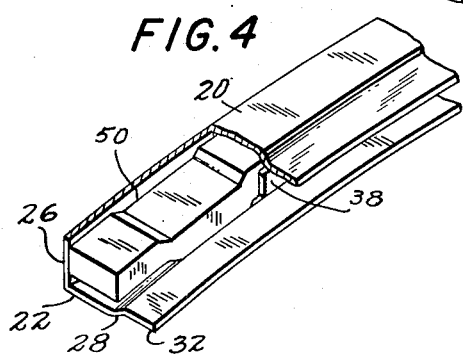
INVENTOR.
PAUL FESSEL
BY Kane, Dalsimer & Kane
ATTORNEYS Nov. 21, 1961 P. FESSEL 3,009,456
ABRADING CUTTERS AND METHODS FOR THEIR FABRICATION
Filed Jan. 21, 1959 6 Sheets-Sheet 2

INVENTOR.
PAUL FESSEL
BY Kane, Dalsimer & Kane
ATTORNEYS

Nov. 21, 1961 P. FESSEL 3,009,456
ABRADING CUTTERS AND METHODS FOR THEIR FABRICATION
Filed Jan. 21, 1959 6 Sheets-Sheet 5

INVENTOR.
PAUL FESSEL
BY Kane, Dalimer & Kane
ATTORNEYS

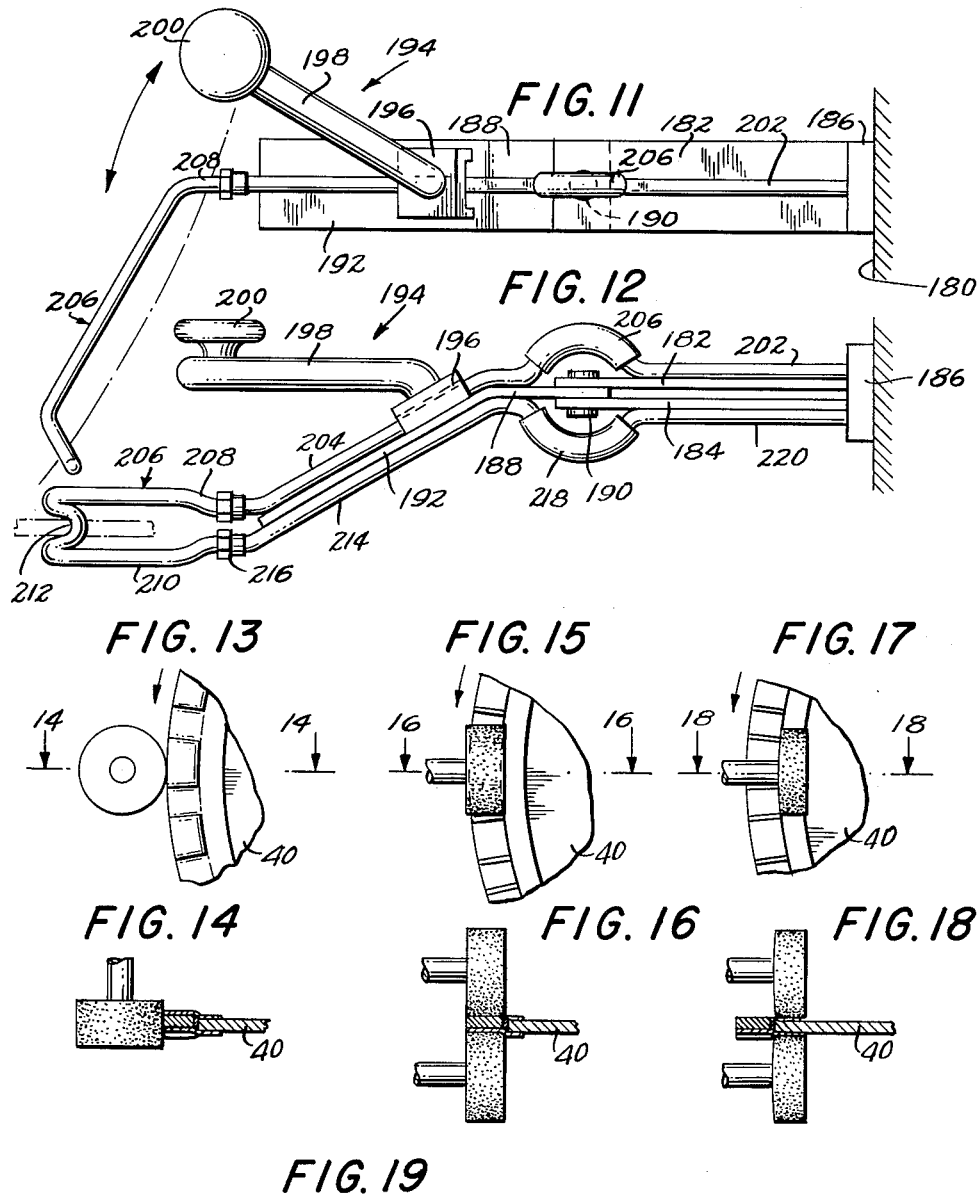

# United States Patent Office

3,009,456
Patented Nov. 21, 1961

3,009,456
ABRADING CUTTERS AND METHODS FOR THEIR FABRICATION
Paul Fessel, 135 Metropolitan Ave., Brooklyn, N.Y.
Filed Jan. 21, 1959, Ser. No. 788,193
11 Claims. (Cl. 125—15)

This invention relates to cutting devices and more specifically to an abrasive cutter associated with peripheral edges of such devices for cutting stone, concrete, both cured and fresh, and other ceramic, vitreous and refractory materials.

A principal object of my invention is to provide a structurally improved abrading cutter characterized by a composition of abrasive particles bonded in, by and throughout a suitable matrix of metal or non-metallic material, and further characterized by the body having offset grooves on opposite sides of the grinding surface.

Another object is to provide a method for associating an abrading body having the above-defined characteristics with a reciprocally movable, rotating disc and other types of saws and cutting apparatus.

A further object is to provide an improved abrading cutter as well as a method for its fabrication wherein an abrading body characterized by a composition of abrasive particles bonded in, by and throughout a suitable matrix of metallic or non-metallic material, and further characterized by the body having offset grooves on opposite sides of the grinding surface, as well as being secured to a selected body support such that a major portion of the body is exposed—with the means for securing the body to the support occupying a minimum amount of surface area capable of supplying an abrading function—and additionally, presenting spaces for providing channels for cooling, to permit the sludge of pulverized material to escape freely without adding to the frictional resistance offered the cutter and to permit water to circulate for cooling purposes if desired.

Still another object is the provision of an improved abrading cutter and method for its formation wherein an abrading body and mount therefor are so constructed and arranged that less than the full side areas of the abrading body contact the adjacent side walls of the partially severed material being operated upon.

A still further object is to provide an improved abrading cutter and method for its formation wherein an abrading body and reduced body mount is secured to cutting and sawing tools and the like, such that the body with its associated reduced body mount is provided with a minimum of cutting surface area for a particular width of cut, thereby resulting in economy of expensive abrasive materials that may be employed in fabricating the body.

An important object is the provision of an improved abrading cutter and method for its formation wherein an abrading body is composed of a compressed or molded mixture of base material including metallic alloys, metals or other materials and abrasive particles such that there results an abrading body having a maximum unit of cutting surface obtained with a minimum unit volume of body material.

Another important object is the provision of an improved abrading cutter and a method for its formation wherein a cutting body comprised of a matrix with abrasive particles dispersed therein is sintered as well as molded in a mounting strip which cooperates to secure the abrading body to an appropriately selected shank.

A further important object is the provision of an improved abrading cutter and method for its formation wherein a pre-sintered and molded abrasive body composed of a matrix having abrasive particles dispersed therein is secured to a selected shank by means of an encasing means which is molded to conform to the outer contours of the abrasive body and then subsequently reduced to expose the desired surfaces of the abrasive body.

Still another important object is the provision of an abrading cutter and method for its formation wherein a cutting body comprised of a matrix having abrasive particles dispersed therein is secured and simultaneously therewith sintered on an appropriately selected shank with the cooperation of means which are adapted to impart forces and pressures in a plurality of directions.

A still further important object is the provision of an improved abrading cutter as well as method for its formation which permits simple cutter construction such as efficient affixation of an abrading body to a selectable shank, and requirements for a minimum number of parts which, in turn, are inexpensive to manufacture and further which facilitate cutter operation at negligible costs.

As an object, provisions are made for forming an improved abrading cutter, which cutter costs less, cuts more footage faster, lasts longer, possesses built-in teeth, possesses teeth which increase proportionately with the size of the blade, presents corrugations which provide an outlet for sludge release and better coolant circulation, can be readily fabricated to possess superior characteristics according to the material to be cut, possesses blade segments which last longer together with being held to their mounting shank in such a manner that these segments will not fail or become disassociated with the mounting shank, is rugged and wear-resistant, and finally balanced to provide superior wet or dry cutting of all types of masonry material.

Numerous other objects and advantages of my invention will become apparent from the following disclosure, which is to be taken in conjunction with the accompanying drawings in which:

FIG. 1 is an exploded perspective view of those components employed in fabricating one form of cutting edge in accordance with my invention;

FIG. 2 is a perspective view partly broken away and sectioned of the components of the cutting edge illustrated in FIG. 1 when in an assembled condition;

FIG. 3 is an enlarged perspective view of a portion of the outer periphery of a disc shank with the assembled cutting edge components illustrated in FIG. 2 mounted thereon and subjected to a pressing operation which in accordance with one embodiment of the present invention is accompanied by a sintering application;

FIG. 4 is substantially similar to FIG. 2 and illustrates the components constituting another form of cutting edge wherein a pre-sintered briquet is employed within an encasing strip prior to their mounting on a disc shank;

FIG. 11 is an enlarged top plan view of the heating element illustrated in FIG. 9;

FIG. 12 is an enlarged side elevational view of this heater element;

FIGS. 13 to 18 illustrate three stages of a possible grinding sequence employed in finishing an abrading cutter fabricated in accordance with my present invention; and FIG. 19 is a portion of a completed abrading cutter subsequent to the grinding operations.

Figure 5:
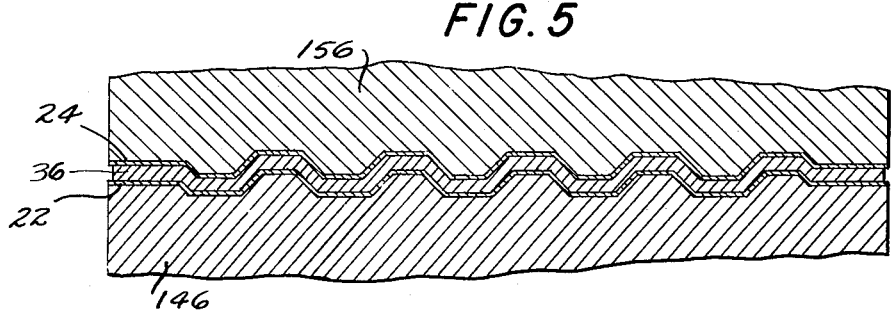
FIG. 5 is a partial sectional view taken along the line 5—5 of FIG. 10, in order to illustrate more clearly the configuration of the cutting edge incident to a stamping operation whether or not such is accompanied by a sintering application substantially simultaneously therewith.
Figure 6:
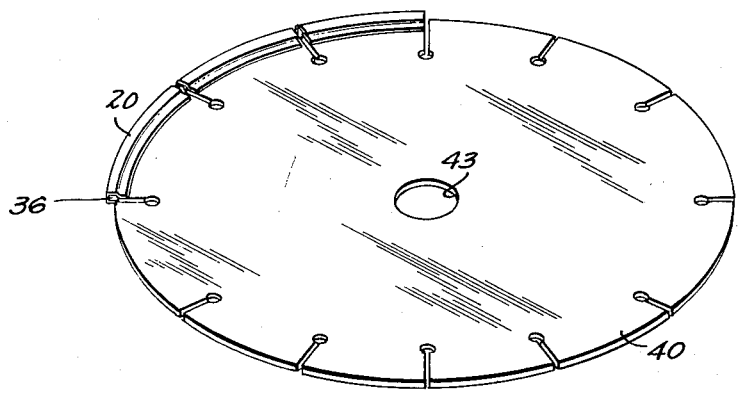
FIG. 6 is a perspective view of a disc formed to receive the assembled components for the blade cutting edge such as those assembled components illustrated in FIG. 2 or FIG. 4.
Figure 7:
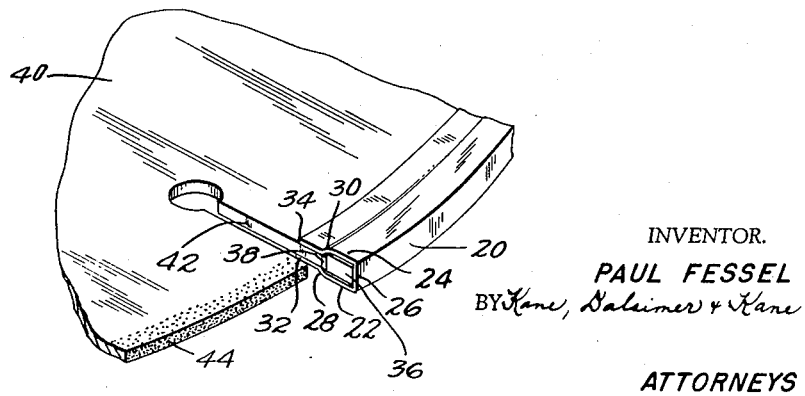
FIG. 7 is an enlarged perspective view of portion of the disc shank before a die stamping operation.

In FIGS. 1 and 2, I illustrate components for one of the preferred forms of cutting edges for my invention and which is peculiarly adapted for application to a disc-type of saw which possesses radial slots at its peripheral edge portions. The cutting edge will thus include a metallic strip 20 of predetermined length which is suitably arcuate to correspond to the curvature of the outer periphery of the selected mounting disc. The strip 20 may be suitably stamped and includes spaced side panels 22 and 24 suitably connected together by an outer backing plate 26. The side panels 22 and 24 converge slightly along the zones 28 and 30, respectively, at a location distal the back plate 26. The side panels 22 and 24 then terminate respectively in spaced terminal sections 32 and 34, suitably spaced from one another so that they will conform with sufficient tolerance to the thickness of the outer peripheral portions of the selected mounting disc.

A briquet 36 is then formed to possess a suitable arcuate configuration and dimensions as, for example, an over-all length slightly less than that of the strip 20 and cross-sectional dimensions such that it can be inserted into strip 20. The briquet 36, when in its finished state, constitutes the abrading body for the cutting edge; and in the state illustrated in FIGS. 1 and 2 (which state is incident to conditions of the cutting edge prior to its final assembly) is the formation resulting from cold pressing of selected powdered material. It is preferred that the briquet is formed from an intimate mixture of any desired powdered matrix material and any desired abrasive particles. In this connection, the matrix may be a powder of metallic alloys and metals, including such materials as brass, iron, nickel, copper, silver or other substances depending upon the cutting edge applications and requirements. On the other hand, the abrasive particles may be of diamond, tungsten, carbides, oxides or other natural or synthetic abrasive materials which again depend upon the cutting edge applications and particular requirements.

A strip 38 of such material as silver solder may then be employed for ultimately cooperating to secure the above components of the cutting edge to the mounting disc shank. This strip 38 of silver solder is substantially as long as the briquet 36 and possesses cross-sectional dimensions such that, together with the briquet 36, they may be incorporated within the confines of the metallic strip 20.

Thus, in the assembled state, as illustrated in FIG. 2, the briquet 36 is in substantial face-to-face contact with the strip 38 of silver solder with both adapted to be neatly encased within the interior of the metallic strip 20; the briquet 36 is accordingly substantially adjacent the backing plate 26, and the strip 38 of silver solder is disposed substantially between the converging sectors 28 and 30 of the side panels 22 and 24, respectively. Since the briquet 36 is cold-pressed, a somewhat reduced deliberate amount of force or pressure will naturally cause some disintegration of the powdered matrix with the contained abrasive particles. Thus, in accordance with the subject embodiment, it is essential that this briquet 36 be sintered. Consequently, it is preferred that this sintering take place while the briquet 36 is contained within the dividually encased and set throughout and do not fall out metallic strip 20 which may be suitably crimped at one or both ends subsequently or prior to the insertion of the briquet 36 and silver solder strip 38 therein. It has been found that superior abrasive body characteristics are possible when the powdered matrix with embedded or dispersed abrasive particles are sintered in a graphite mold under suitable heat and pressures. Accordingly, prior to the insertion of the briquet 36 and silver solder strip 38 within metallic strip 20, the latter is preferably coated with colloidal graphite along the faces of its backing plate 26 and side panels 22 and 24.

The assembled components illustrated in FIG. 2 are then mounted on a suitable shank 40 which, for purposes of the description of this embodiment, may be of the disc type such as that partially illustrated in FIG. 3. This disc 40 may be of any selected diameter and preferably includes spaced radial slots 42 at its outer periphery and a centrally located opening 43. These radial slots 42 serve to compensate for stresses and strains that may develop in the disc 40 during an abrading operation and thus prevent failure of the disc especially along its peripheral edges. Colloidal graphite may be additionally applied on sectors of the side faces of the disc 40 which are adapted to be disposed between the terminal sectors 32 and 34 of the side panels 22 and 24, respectively, of the metallic strip 20. A suitable flux for the silver solder 38 may be interposed between the strip 38 and the outer peripheral edge 44 of the disc 40. The assembled components constituting the cutting edge as illustrated in FIG. 2, when mounted on the selected portions of the disc 40, are then subjected to a sintering as well as a die pressing operation which are to be described in the following to arrive at the stamped structure partially illustrated in FIG. 3. There it will be observed that the cutting edge is securely anchored to the disc 40 with the metallic strip 20 together with the now sintered briquet 36 possessing corrugated or undulated side faces. In this connection, the side panels 22 and 24 are thus provided with spaced grooves therein extending inwardly from the structurally modified backing plate 26. As shown, the grooves are radially disposed and extend short of the longitudinal center of the backing plate 26 and of the outer peripheral edge 44 of the disc 40.

The mixture of the matrix powder and the abrasive particles when subjected to the aforedescribed molding and sintering operation in the provided graphite mold is heated to about 2800° F. and subjected to a pressure up to 40 tons/p.s.i. Of course, these conditions will vary depending upon the type powder used for the matrix and the particles used for the abrasive. It has been found that when diamond particles are employed, they may be in the form of a powder ranging from 16-grit down to micro-sizes, so that the resultant abrading body has between 4 to 14 grains of diamond powder per cu. in. of abrading body.

The abrading body becomes rigid and hard after the molding and setting and is thus sintered to possess abrasive qualities adapted for severing the work with which it contacts. Although the now sintered briquet 36 will adequately adhere to the peripheral edge 44 of the disc 40, it has been found desirable to include the interposed silver solder strip 38 to increase the bond between these parts. As a result of the multi-directional pressures developed during the die stamping operation, the powdered matrix of the briquet 36 as well as the silver solder strip 38, will flow slightly and thus occupy portions of the juncture between the terminal sectors 32 and 34 of the metallic strip 20 and the peripheral side faces of the disc 40 underlying these sectors. Accordingly, these sectors of the strip 20, namely, sectors 32 and 34, will be firmly anchored to the disc 40 to thus provide additional means for strengthening the securement of the cutting edge to the disc shank.

The abrasive particles being distributed through the matrix of the sintered briquet 36 are uniformly and in- until sufficient of the matrix casing is worn down. After the cutting edge has been subjected to further finishing steps the sintered briquet 36 will thus saw faster and last appreciably longer. The spaced radial grooves appearing both in the metallic strip 20 and sintered briquet 36 will reduce normal frictional contact of the side walls of the cutting edge. The formed grooves will additionally permit sludge or pulverized material to escape freely without adding to frictional resistance, as well as permit water to circulate through the abrading body and the stone or similar material to be cut or severed. Moreover, air cooling is enhanced and the saw consequently works faster and lasts longer as a result of the abrading body of this invention.

This invention additionally contemplates the securement of a pre-sintered briquet having the desired configuration to an appropriate mounting shank. Thus, in FIG. 4 a pre-sintered abrading body 50 formed from a powdered matrix having dispersed therein suitable abrasive particles, is inserted with sufficient clearance within the internal faces of the metallic strip 20. This briquet is sintered with spaced radial grooves as shown, and is substantially identical in configuration with the sintered abrasive body illustrated in FIG. 3. A silver solder strip 38 or other appropriate securing means may then be interposed between the pre-sintered abrading body 50 and the peripheral edge of the selected mounting shank, as for example, the disc-type represented by the numeral 40. A suitable flux may be placed between the silver solder strip 38 and the peripheral edge 44 of this disc-type support 40 or located elsewhere for performing its intended function, as for example, a lining with the metallic strip 20. The assembled cutting edge illustrated in FIG. 4 is appropriately positioned on the peripheral edge portions of the mounting disc 40 between the provided radial slots 42. Since the briquet 50 has been pre-sintered, it is only necessary at this time to supply sufficient heat to melt the contained silver solder strip 38. Upon the application of the proper amount of heat, the assembled cutting edge of this embodiment while on the mounting disc 40 is then subjected to a die-stamping operation to deform the metallic strip 20 and consequently conform its configuration to that of the internally mounted briquet 50. This die-stamping operation provides the proper amount of multi-directional pressures to cause the proper securement of the briquet 50 as well as the metal strip 20 to the peripheral edge portions of the mounting disc 40.

Figure 8:
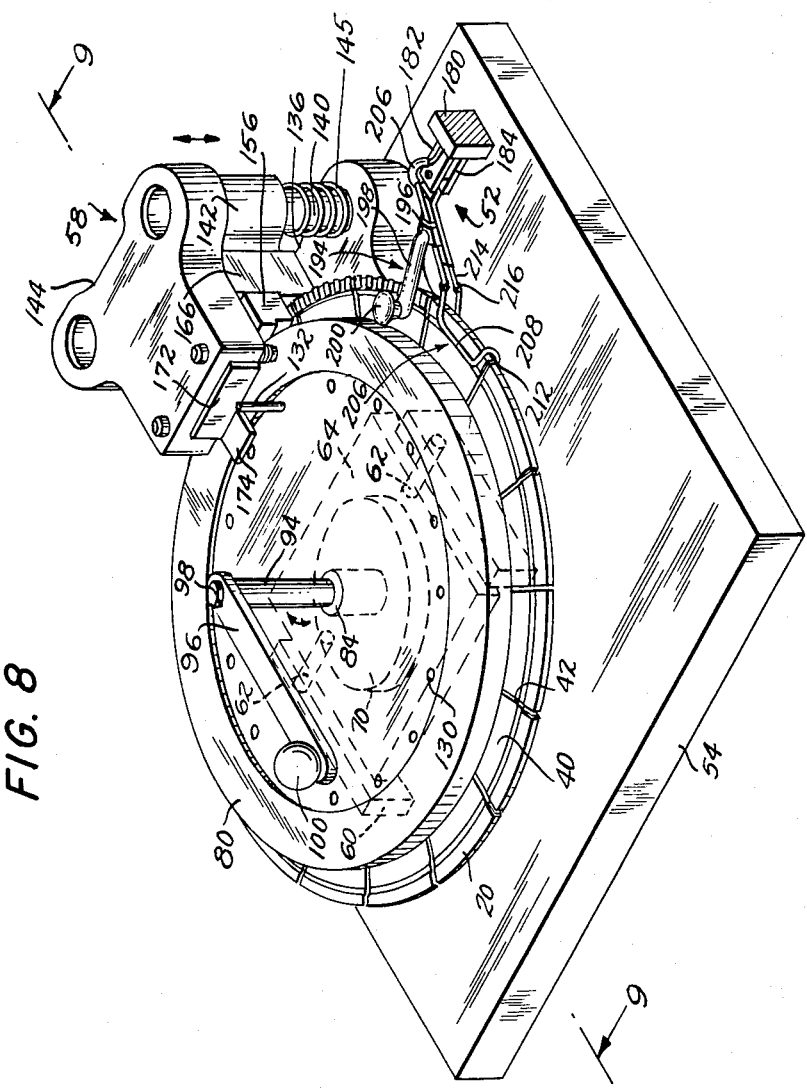
FIG. 8 is a perspective view of a press particularly suited for cooperating to form the corrugations in the cutting edge of an assembled disc and cutting edge combination illustrated in FIG. 6; and additionally includes a heating element advantageously employed where a sintering application is to accompany the pressing step.
Figure 9:
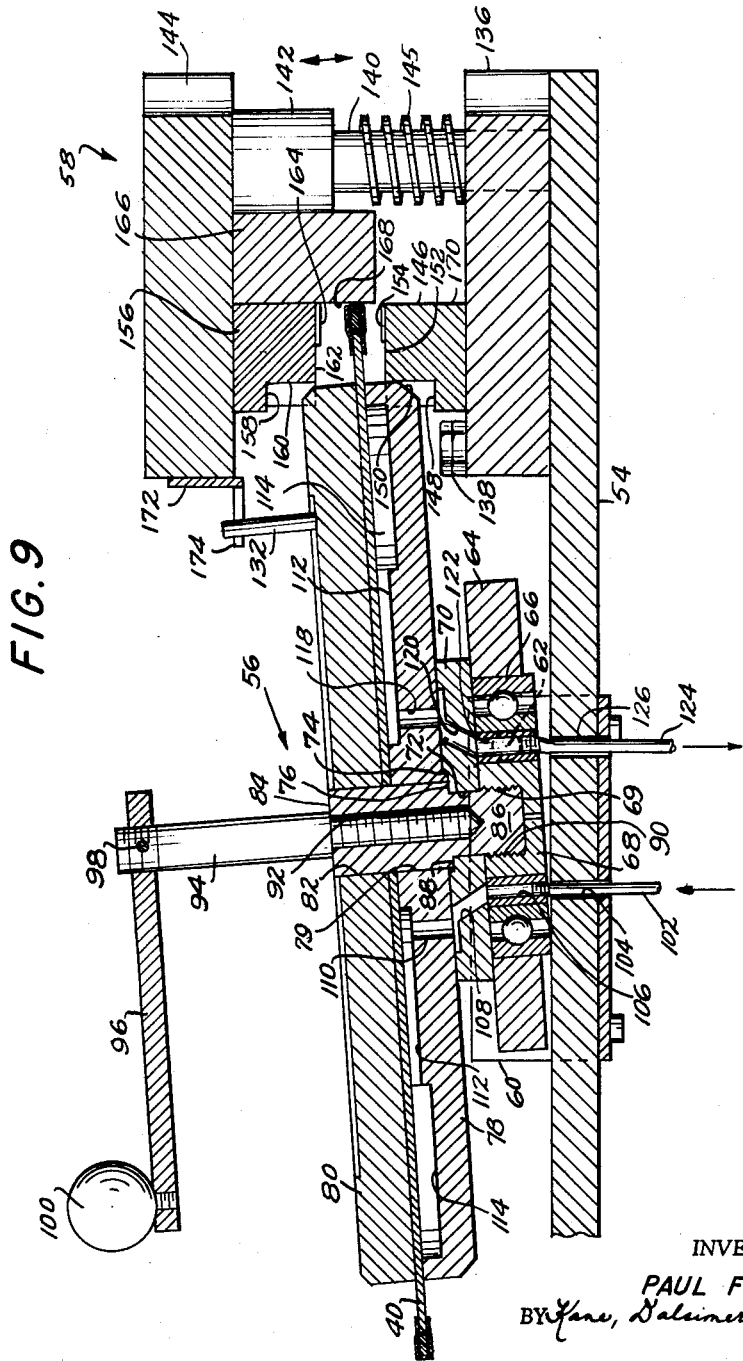
FIG. 9 is a sectional view taken along the line 9—9 of FIG. 8 and illustrates the press prior to a die stamping operation.
Figure 10:
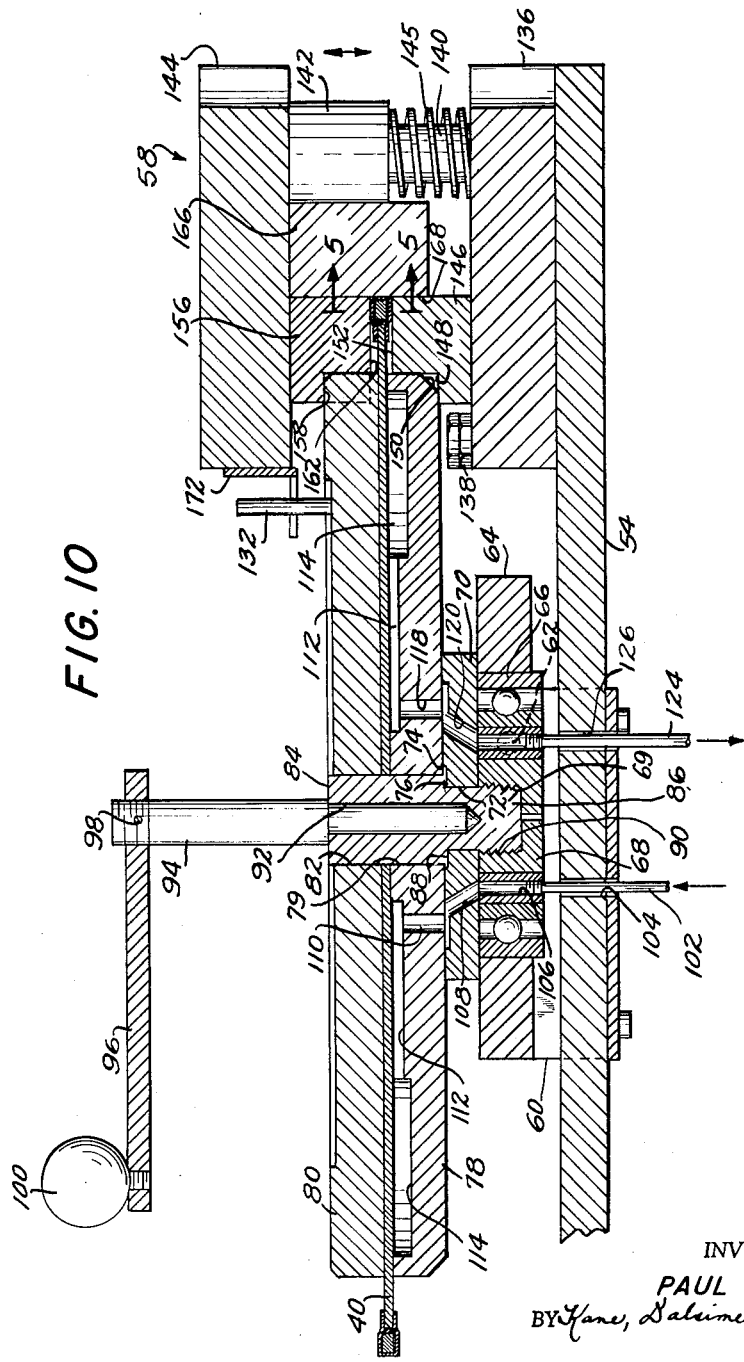
FIG. 10 is substantially similar to FIG. 9, but illustrates the press during an actual die stamping cycle, and thusly the formulation of the corrugations in the cutting edge of the disc.

Reference is now had to FIGS. 8, 9 and 10, wherein I illustrate a stamping die press for supplying the desired multi-directional lines of force necessary in securing the cutting edge, illustrated in either FIGS. 2 or 4, to the disc-type of shank 40. The press illustrated in these figures is to be associated with a heating device 52 illustrated somewhat schematically in FIG. 8 and in detail in FIGS. 11 and 12. The press includes a supporting platform 54 which is suitably mounted to be disposed in substantially a horizontal plane. An internally rotatable and swivelly mounted disc holder 56 as well as a reciprocal die 58 are mounted on this platform 54.

The disc holder 56 is swivelly mounted between a pair of upstanding plates 60 which are suitably secured to the mounting platform 54. Pins 62, which extend from the bearing mounting plate 64, are journaled in these side plates 60 to effect the desired swivel movement of the disc holder 56. A ball bearing 66 is secured within the bearing plate 64 and is of annular configuration, with one of the races thereof secured to an internal annular plate portion 68 which has an internally threaded bore 69. As will be appreciated, the ball bearing 66 permits the desired rotation of the disc holder 56 which is intended to be primarily with respect to the die 58.

A plate 70 is then mounted on the plate 64, as well as the internal plate portion 68, and is adapted to rotate with the latter relative to the plate 64. This plate 70 is formed with a central bore 72 which extends into an enlarged outer bore 74 for cooperating therewith to provide an annular shoulder 76. A lower disc holding plate 78 rests upon the plate 70 and is similarly provided with a somewhat enlarged central bore 79. The disc 40 with its circumferentially mounted cutting edges, as for example, those illustrated in either FIG. 2 or FIG. 4, extending along the entire annular periphery thereof, is then placed upon the lower disc holding plate 78. As mentioned in the foregoing, the disc 40 is provided with a centrally-located opening 43 for providing means for mounting the finished saw on a proper shaft (not shown). An upper disc-holding plate 80 is then disposed on the upper face of the disc 40 and is similarly provided with a central aperture 82.

A pin 84 includes a reduced portion 86 which cooperates to form a shoulder 88. The reduced portion 86 is provided with internal threads 90 which are meshed with the internal threads 69 of the internal disc portion 68. In this connection, the pin 84 will extend into the bore 82 of the upper die-holding plate 80, and bore 43 of the disc 40, bore 79 of the lower disc-holding plate 78, and shoulder 88 will then rest upon the shoulder 76 of the plate 70 with the reduced section 86 disposed within bore 72 of the latter plate 70. The pin 84 is additionally provided with a tapped bore 92 which extends short of the terminal end of the pin extension 86. A threaded rod 94 is then secrewed in the tapped bore 92, substantially as shown, and conveniently supports, at the top thereof, a handle 96 by means of a locking screw 98. Handle 96 mounts at its free end of a finger-grasping knob 100 which is threadedly secured thereto in a manner substantially as illustrated. Thus, the disc holding assembly 56 is permitted to swivel about its pins 62 and is additionally afforded rotation relative to its bearing plate 64 through ball bearing 66.

As mentioned in the foregoing, the cutting edges are subjected to a heat application prior to the die-stamping operation. In this connection, I have found that as the diameter of the disc 40 increases, it will be desirable to provide a cooling means for the press mounted disc 40. A coolant is usually not necessary for discs ranging in diameter below 12 inches.

As illustrated in the subject views, suitable apertures and passages extend through the components of the disc holder 56 in order that a selected coolant can be properly circulated to ultimately encounter portions of the disc 40. Thus, this coolant may be supplied through a hose or length of tubing 102 which extends into an opening 104 in the mounting support 54 to communicate with a passage 106 in the internal disc portion 68. A passage 108 formed in the plate 70 communicates with this passage 106 as well as aperture 110. This aperture 110 extends into a radial recess 112 formed in the upper face of the lower disc holding plate 78. This recess 112 extends into an annular recess portion 114 formed in the upper face of disc holding plate 78. This annular recess 114 provides the necessary passageway for directly applying a coolant to the essential parts of the disc 40. A similar network of passageways is provided to effect the return of the coolant from the annular recess 114 to the supply source (not shown) and thus facilitate the recirculation of the coolant.

In this connection, the radial recess 116 extends from the annular recess portion 114 and communicates with the aperture 118. Aperture 118, in turn, communicates with the aperture 120 which is associated with the opening 122. Surfaces of the opening 122 are coupled with the length of tubing 124 which extends through an opening 126 in the support 54 into the supply tank for the selected coolant. This coolant may then be recirculated through the inlet passages into the annular recess 114 to effect the desired decrease in temperature of the disc 40.

As more clearly shown in FIG. 8, the upper disc holding plate 80 is provided with a series of openings 130 which are disposed on the radial line extending through each radial slot 42 appearing at the outer periphery of the disc 40. These openings 130 cooperate to provide a stopping means for the disc to insure registry of the cutting edge segments, which ordinarily have a length substantially equal to the length of the metallic strip 20, in the die faces of the die press 58. A pin 132 is adapted to be placed in these openings 130 with a part thereof extending beyond the upper face of the upper disc holding plate 80 for engaging surfaces of the die press 58.

Referring now to the die press 58, it will be observed that a lower die support plate 136 is suitably anchored to the mounting support 54 by means of a series of bolts 138. A pair of cylindrical rods 140 are mounted by the stationary lower die supporting plate 136, and reciprocal in enlarged cylindrical members 142 which are coupled with the upper die support plate 144. Compression springs 145 are employed to provide the proper spaced apart relationship of these plates. The upper die support plate 144 may then be coupled with suitable power means for effecting the desired reciprocation of this plate with respect to the lower die support plate 136 at the proper time and for the desired period.

The lower die support plate 136 securely mounts a lower stepped die member 146. A step 148 is provided on member 146 and is advantageously adapted to support and engage the lower face of the lower disc support plate 78, during a die-stamping operation. The side face 150 of the die member 146 is arcuately contoured to be disposed in a circle concentric with that of the outer peripheral edge of the lower disc support member 78. The upper platform 152 of the lower die member 146 includes the preselected die faces and cavities 154 for providing the cutting edge configuration illustrated in FIG. 3. Obviously, the die faces and cavities 154 should be suitably formed to embrace the arcuate faces of the cutting edge segments and additionally should extend for substantially the entire length thereof.

Referring now to the upper die member 156, which is suitably supported by the upper die support plate 144, it will be observed that a stepped platform 158 is provided for embracing the upper face of the upper disc support plate 80. An arcuate side face 160 is provided to conform to the contours of this upper die support plate 80. The upper die member 156 includes the platform 162 which presents the die faces and cavities 164 which complement those of the lower die faces 154 and which extend for substantially the length of a cutting edge segment. A backing plate 166 extends from the upper die support plate 144 and includes a side face 168 which is arcuately formed and adapted to slide with respect to the outer side face 170 of the lower die member 146. It will be observed that a plate 172 is secured to the upper die support plate 144 and includes a laterally extending stop flange 174. This flange 174 is adapted to engage the projecting pin 132 so that a cutting edge segment will be properly disposed between the die faces 154 and 164 upon the rotation of the disc holding assembly 56. After a particular die-stamping operation, the pin 132 is removed from its mounting aperture 130, moved clockwise as viewed in FIG. 8, and then placed into the next appearing aperture 130 in the plate 80. Thus the disc 40 with its mounted cutting edge segments will be ready for the next die-stamping cycle.

Of course, structural modifications should be made to accommodate discs 40 having different diameters, and such will be apparent to those skilled in the art.

Of primary importance are the provisions for a structure capable of supplying pressures in a vertical direction as well as a radial direction toward the center of the segment mounting disc 40. Thus when the upper die member 156 is reciprocated in a downward direction with respect to the stationary lower die member 146, the disc 40, which is ordinarily disposed in a plane inclined with respect to the horizontal, will be forced downwardly by upper die face 164 into engagement with lower die face 154. Upon the completion of the downward stroke of the upper die member 156, the disc 40 will be disposed in a plane substantially parallel with that of the mounting support 54. Consequently, when one considers a geometrical triangle and the disposition of parts illustrated in FIG. 9, it will be clear that a radial sector of the disc 40, which extends to the right of the pin 94, will originally form the hypotenuse of a triangle, with a horizontal line coincident with the plane of platform 152 defining its longer side. However, when this disc is shifted to the position illustrated in FIG. 10, this sector of the disc 40 will now be forced to assume the disposition and length of the longer leg of the original triangle, with a vertical sector of the face 168 of the backing plate 166 being the other leg of this triangle. Thus, since a decrease in the radial distance of the disc 40 from its center to the outer edge of the affected cutting edge segment is inevitable, this cutting edge segment will be subjected to radial pressures by its engagement with surface 168 of the backing plate 166. Thus, a relatively simple structure is possible for supplying the desired pressures for acting upon the disc mounted cutting edge segments.

Reference is now had to FIG. 11 and FIG. 12, wherein the heating element 52 is illustrated in somewhat greater detail. The illustrated structure of this heating element may be coupled with an induction heater which may be of a commercial type, such as that available under the trade name "Ther-Monic," manufactured by the Induction Heating Corp., of Brooklyn, New York. The heating element 52 includes a pair of spaced flexible plates 182 and 184 suitably connected to a mounting block 186, which, in turn, is secured to the chassis of the induction heater 180. A substantially flexible strip 188 is disposed between the plates 182 and 184 and is swivelly mounted with respect to these plates by means of a pin 190. The strip 188 is provided with a downwardly inclined portion 192 which serves to support a handle 194. This handle 194 includes a mounting block 196 suitably secured to the downwardly inclined portion 192 of the strip 190. The block 196 mounts a substantially horizontally extending post 198 which has mounted on the free end thereof a hand-grasping knob 200. Thus by simple actuating the handle 194, the strip 188 will be pivoted with respect to the spaced plates 182 and 184 about the pin 190.

A coil 202 extends from the induction heater 180 and extends into another length of tubing 204 through a flexible coupling 206. The length of tubing 204 passes through a suitably cut-out portion in the mounting block 196 of the handle 194. A heat inducing member 206 is connected with the length of tubing 204 by means of a suitable coupling 208. The heat inducing member 206 preferably assumes a configuration simulating that illustrated in FIGS. 11 and 12. In this connection, it will be observed that the member 206 includes spaced lengths of tubing 208 and 210 communicating with one another through the integrally interposed curved section of tubing 212. In FIG. 11 it will be observed that both of the spaced lengths of tubing 208 and 210 are on an incline with respect to the length of tubing 204. The curved part 212, on the other hand, is at an angle with respect to the plane defined by the lengths of tubing 208 and 210. This particular configuration of the heat inducing member 206 is extremely desirable in properly supplying heat to the curved cutting edge segments mounted on a disc 40 prior to a stamping operation.

The length of tubing 210 is connected with a length of tubing 214 by means of a coupling 216. Tubing 214 is suitably anchored to the under face of the strip 192 and additionally communicates with a length of flexible tubing 218. Tubing 218 then couples with a length of tubing 220, which, in turn, extends into the induction heater 180.

In some of the contemplated disc saw-type fabrications, in which the briquet 36 is not pre-sintered, heat applications ranging from 1,800 to 1,900° F. were supplied for approximately 20 seconds. And in some instances, low as 1,650° F. was necessary to effect the desired sintering of this briquet in strip 20. Obviously, the amount and duration of the heat supplied by the heat inducing element 206 will depend upon the material constituting the matrix of the briquet 36.

When employing the pre-sintered abrasive body illustrated in FIG. 4, to produce a cutting edge for a disc-type saw, the heat inducing element 206 need only supply 1,500° F. of heat for approximately 5 seconds to obtain proper end results. Again, this heat application will vary depending upon the requirements and selected conditions. Obviously, the amount and duration of the requisite heat may be automatically regulated by the above-mentioned commercial type of induction heater unit 180 which accordingly may be pre-set to produce the desired regulation.

In summary, when assembled cutting edge segments are set and mounted on the disc 40, which, in turn, is properly positioned in the disc holding plate assembly 56, an operator will select a particular segment to be stamped. Then, he will correctly position the pin 132 in the appropriate hole 130 to insure that this segment will be disposed between the confines of the die faces 154 and 164 when pin 132 encounters the laterally projecting flange 174. The operator will then swing the heat inducing member 206 by means of the handle 194 so that this member 206 properly embraces the selected cutting edge segment. The proper amount of heat is then supplied for the required period of time to this cutting edge segment.

After the operator swings the heat inducing element 206 away from the disc 40 by means of the handle 194, the disc 40 is then rotated by means of the handle 96 so that the heated segment will be disposed between the die faces 154 and 164. The correct disposition is assured by the engagement of stop pin 132 with the laterally projecting flange 174. The die members 156 and 146 are then suitably closed so that the desired amount and direction of pressures are imparted by the die press 58. Thusly, a cutting edge segment, as illustrated in FIG. 3, is securely positioned on the selected portion of the outer periphery of disc 40, and additionally will possess the preferred indulations or corrugations.

When the cutting edge segments have been properly pressed and secured along the entire peripheral edges of the disc 40, a grinding operation, such as that illustrated in FIGS. 13 and 14, is then performed to remove the deformed backing plate 26 of metallic strip 20 to thereby expose the abrading edge of the sintered abrasive body 36. The projecting portions of the side plates 22 and 24 of the metallic strip 20 are removed by a similar grinding operation to expose the adjacent side faces of the protruding portions of this sintered briquet 36. In order that the width of the cutting edge, which will determine the width of cut, will be wider than the thickness of the disc 40, to thereby minimize frictional resistance and provide access for sludge removal and air circulation, a portion of the paneled sections 32 and 34 of the metallic strip 20 are removed. The amount that these sections are reduced in thickness will depend upon the required offset. In some instances, a major portion of paneled sections 32 and 34 were removed to obtain the required offset of the undulated or corrugated side faces of the cutting edge.

In FIG. 19 I illustrate a portion of a disc mounted cutting edge segment after it has been subjected to all of the aforegoing fabrication steps. It will be noted that the grooved or recessed portions of the side plates 22 and 24 of metallic strip 20 are disposed within the corresponding grooves of the sintered briquet 36, and in no way will affect the efficient operation of the finished abrading cutter.

Although the foregoing description and accompanying drawings were directed primarily to a disc type of abrading cutter, it should be understood that my invention is equally applicable to other types of saw blades such as those of the tubular type, cylindrical type, band saw type and reciprocating type; and the order of steps in the disclosed assembly process or their equivalents may be resorted to in fabricating such blades.

Thus, a very effective cutting edge and abrading body is provided possessing maximum cutting surfaces within a minimum unit volume of abrading body. In addition, the abrasive particles are uniformly encased and distributed in a uniform matrix; and the exposed abrasive particles will not be dissipated until the matrix itself is worn down, whereupon more abrasive particles are exposed.

I wish it understood that minor changes and variations in the composition, shape and application of the abrading body to a selected shank be resorted to without departing from the spirit of the invention which is to be defined by the scope of the appended claims.

I claim:

1. An abrading cutter comprising a shank having a peripheral edge, an abrading body mounted on said peripheral edge and comprised of a uniform matrix and abrasive particles bonded throughout said matrix, said body being sintered and having an end operative grinding surface and having offset sides including spaced and staggered grooves so that the width of a resultant cut exceeds the thickness of said body along the said surface, a deformable member embracing said body and cooperating to secure said body to said shank and having portions thereof disposed in said grooves, said shank being formed with said slots spaced from one another along said peripheral edge, and said body being located between a pair of said slots.

2. The invention in accordance with claim 1, wherein said member initially encases a major portion of said body and is deformed to mold said body therein to provide said grooves, and the portions of the sides of said member intermediate said grooves being reduced in thickness to expose portions of said body intermediate said grooves while portions of said member are reduced to expose said end operative grinding surface of said body.

3. The invention in accordance with claim 1, wherein said member initially encases a major portion of said body, and portions of the sides of said member intermediate said grooves being reduced in thickness to expose portions of said body intermediate said grooves while portions of said member are reduced to expose said end operative grinding surface of said body.

4. The invention in accordance with claim 3, wheren other portions of said member are partially reduced to thus provide a shoulder adjacent the exposed portions of the sides of said body.

5. The invention in accordance with claim 1, wherein a bonding material is interposed between surfaces of said shank, said abrading body, and deformable member for cooperating to secure them with respect to one another.

6. A method for forming an abrading cutter comprising the steps for providing a support, a pre-sintered cutting body having an end operative grinding surface and having offset sides including spaced and staggered grooves comprised of a uniform matrix and abrasive particles bonded throughout by said matrix, and a preformed strip for encasing said body securing said strip as well as said body to said support and substantially simultaneously therewith molding said strip to the configuration of said body, reducing surfaces of said strip to expose said end operative grinding surface of said body reducing surfaces of said strip intermediate said grooves to expose portions of said body intermediate said grooves.

7. The invention in accordance with claim 6, wherein other portions of said strip are partially reduced to thus provide a shoulder adjacent the exposed portions of the sides of said body.

8. The invention in accordance with claim 6, wherein a bonding material is interposed between surfaces of said support, said pre-sintered cutting body, and said strip for cooperating to secure them with respect to one another.

9. A method for forming an abrading cutter comprising the steps of providing a support, a body comprised of a uniform matrix and abrasive particles bonded throughout by said matrix, and a preformed strip for encasing said body, sintering said body and substantially simultaneously therewith molding said strip while said body is encased thereby to secure said strip as well as said body to said support and to provide said body with an end operative grinding surface and offset sides including spaced and staggered grooves, reducing surfaces of said strip to expose said end operative grinding surface of said body reducing surfaces of said strip intermediate said grooves to expose portions of said body intermediate said grooves.

10. The invention in accordance with claim 9, wherein other portions of said strip are partially reduced to thus provide a shoulder adjacent the exposed portions of the sides of said body.

11. The invention in accordance with claim 9, wherein a bonding material is interposed between surfaces of said support, said pre-sintered cutting body, and said strip for cooperating to secure them with respect to one another.

References Cited in the file of this patent

UNITED STATES PATENTS

| | | |
|---|---|---|
| 1,950,355 | De Bats | Mar. 6, 1934 |
| 2,032,395 | Bley | Mar. 3, 1936 |
| 2,352,246 | Benner et al. | June 27, 1944 |
| 2,405,086 | Bevillard | July 30, 1946 |
| 2,811,960 | Fessel | Nov. 5, 1957 |
| 2,818,850 | Schwarzkopf | Jan. 7, 1958 |
| 2,892,707 | Biggs | June 30, 1959 |